United States Patent [19]

Hutchinson

[11] 4,292,603

[45] Sep. 29, 1981

[54] EXCIPLEX LASERS

[75] Inventor: Marcus H. R. Hutchinson, Harrow, England

[73] Assignee: National Research Development Corporation, London, England

[21] Appl. No.: 917,358

[22] Filed: Jun. 20, 1978

[30] Foreign Application Priority Data

Jun. 21, 1977 [GB] United Kingdom ............... 25861/77

[51] Int. Cl.³ .......................... H01S 3/22; H01S 3/223
[52] U.S. Cl. ......................... 331/94.5 G; 331/94.5 PE
[58] Field of Search .................... 331/94.5 G, 94.5 PE

[56] References Cited
PUBLICATIONS

Chen et al., "A Potential Hydroxyl Ultraviolet Laser*", Optics Communications, vol. 18, No. 4, Sep. 1976, pp. 476-478.
Downey et al., "A Pure-Rotational Collisionally Pumped OH Laser*", The Journal of Chemical Physics, vol. 66, No. 4, 15 Feb. 1977, pp. 1685-1688.
Wang et al., "Fast-Discharge-Initiated XeF Laser*", Applied Physics Letters, vol. 28, No. 6, 15 Mar. 1976, pp. 326-328.

Primary Examiner—James W. Davie
Attorney, Agent, or Firm—Cushman, Darby & Cushman

[57] ABSTRACT

A laser contains as a lasing medium a noble gas and a compound including one or more of the hydroxide, nitride, cyanide, acetylide, phenyl, ethyl, phenoxide and ethoxide radicals which form noble gas exciplexes and emit coherent energy on dissociation to the ground state.

8 Claims, 1 Drawing Figure

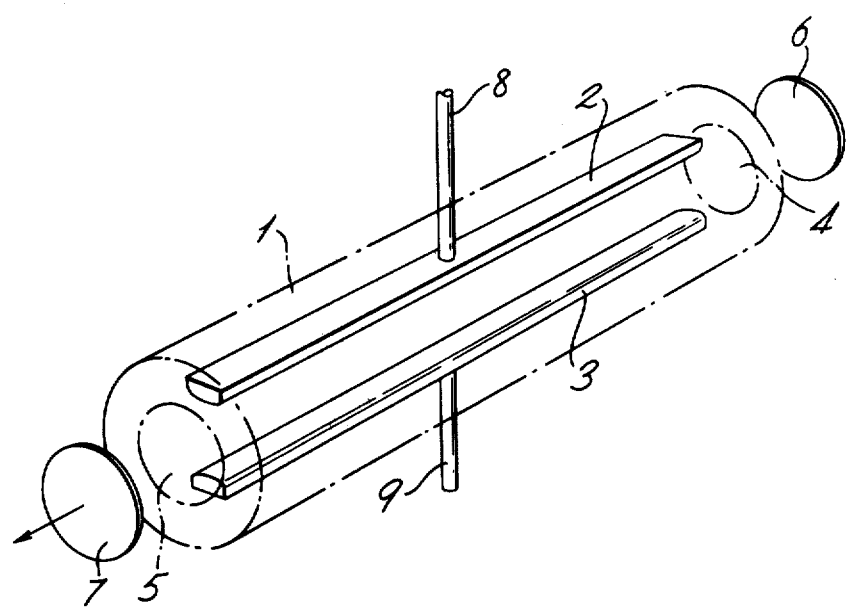

EXCIPLEX LASERS

This invention relates to lasers.

Many materials are known which can be stimulated to produce coherent electromagnetic radiation at defined wavelengths. Among them are the noble gases and mixtures of these gases. Recently a new class of lasing materials have been described. These are the noble gas halides in which atoms of a noble gas when in an excited state react with halide molecules to form an exciplex, or an excited complex. The exciplex when in a suitable laser resonant cavity emits coherent energy and decays to a groundstate when it disassociates into its constituents.

According to a feature of the present invention a laser comprises a container of a noble gas and of a compound which includes hydroxyl ions, means for pumping energy into the container so as to raise the noble gas to an excited state and allow the formation of a noble gas hydroxide exciplex and resonating means comprising a multiple reflection path which includes the container so as to enable the exciplex to emit a coherent beam of energy of a defined wavelength and thereupon disassociate into its constituents.

The said compound may be water vapour or other suitable reagent.

The means for pumping energy may comprise means for generating an electron beam or an electrical discharge preferably a buffer gas is included to assist the pumping action by absorbing energy from incident electrons and transferring the energy by collision to the noble gas. The buffer gas may itself comprise a different noble gas. By placing a frequency dispersive component such as a diffraction grating or a prism in the resonant path in the laser it is possible to tune the laser to a selected frequency within a defined bandwidth.

In order that the invention may be more fully understood reference will now be made to the drawing accompanying this specification, the single FIGURE of which illustrates an embodiment thereof.

Referring now to the FIGURE there is shown therein a laser comprising a container 1 constructed of electrically insulating material. Two electrodes 2 and 3 extend axially along the length of the container diametrically opposite each other and the ends of the container are sealed by windows 4 and 5 transparent to the band of radiation at which the laser operates. Mirrors 6 and 7 are positioned outside the container and between them define a resonant path including the length of the container for any laser action that is stimulated. Mirror 7 is half-silvered so that the beam generated in the laser can be emitted therefrom for external use. External terminals 8 and 9 are provided to the electrodes 2 and 3.

The container 1 is filled with a mixture of argon, xenon and water vapour in the ratios 1500/100/5. The above mixture is described by way of example and alternative proportions of these constituents or different noble gases can alternatively be used.

A suitable rapid discharge electrical circuit is connected to terminals 8 and 9 to pump energy into the gaseous mixture in container 1. The argon in the container, which forms the greater part of the mixture, absorbs energy from the incident electrons and transfers this energy by collision to the xenon atoms which are thereby excited to form Xe*. It should be noted that the argon does not take part in the laser reaction but merely acts as a buffer between the incident electron beam and the xenon. Alternatively instead of or additional to the argon, helium gas can be included to fulfill a similar function.

With the xenon in an excited state the following reaction occur:

$$Xe^* + H_2O = XeOH^* + H \cdot \quad (1)$$

$$XeOH^* = Xe + OH \cdot + h \quad (2)$$

$$H \cdot + OH \cdot = H_2O \quad (3)$$

where h is Planck's constant and is the frequency of the emitted energy.

The wavelength of the energy which is emitted as indicated by Equation (2) in the above example is at approximately 234 nm. The radiative life time of the xenon hydroxide exciplex is about 4 nsecs and the fluorescence band width is about 3.5 nm. Thus the frequency of radiation emission can be varied within a band by tuning the resonator formed by the path between the mirrors 6 and 7 as by a prism or any other suitable arrangement.

In the above example energy is pumped into the laser by means of an electrical discharge. Other means for pumping energy can alternatively be used. One example is to inject high energy electrons into the container as described in U.K. Pat. Specification No. 1,476,134 and its corresponding U.S. Pat. No. 3,983,508.

I claim:

1. A laser comprising a container of a noble gas and of a compound which includes hydroxyl ions, means for pumping energy into the container so as to raise the noble gas to an excited state and allow the formation of a noble gas hydroxide exciplex and resonating means comprising a multiple reflection path which includes the container so as to enable the exciplex to emit a coherent beam of energy of a defined wavelength and thereupon disassociate into its constituents.

2. The laser as claimed in claim 1 in which the said compound comprises water vapour.

3. The laser as claimed in claims 1 or 2 in which the means for pumping energy comprises means for generating an electron beam.

4. The laser as claimed in claim 1 or 2 in which a buffer gas is included to assist the pumping action by absorbing energy from incident electrons and transferring the energy by collision to the noble gas.

5. The laser as claimed in claim 4 in which the buffer gas comprises aother noble gas.

6. The laser as in claim 3 in which a buffer gas is included to assist the pumping action by absorbing energy from incident electrons and transferring the energy by collision to the noble gas.

7. The laser as claimed in claim 1 in which the said noble gas is xenon.

8. The laser as claimed in claim 1 or 2 in which the means for pumping energy comprises means for generating an electrical discharge.

* * * * *